Feb. 16, 1932.  U. U. ULAM ET AL  1,845,855
MOTOR VEHICLE STARTING ATTACHMENT
Filed Oct. 5, 1928
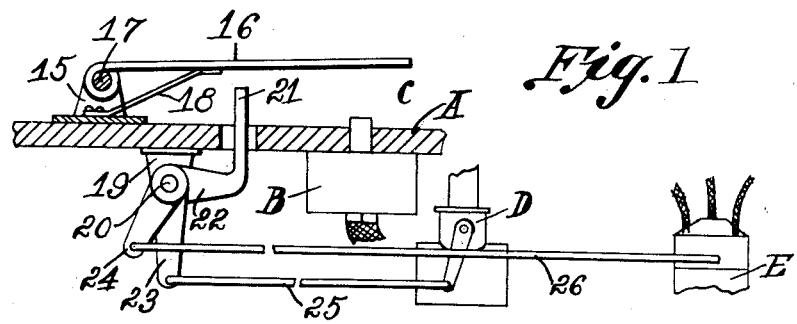
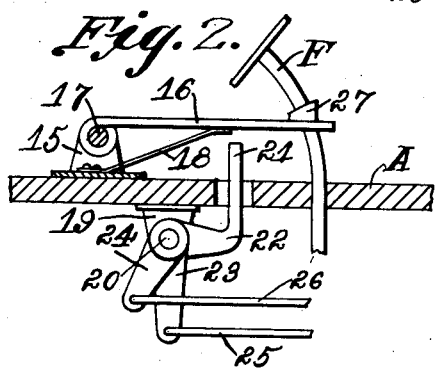
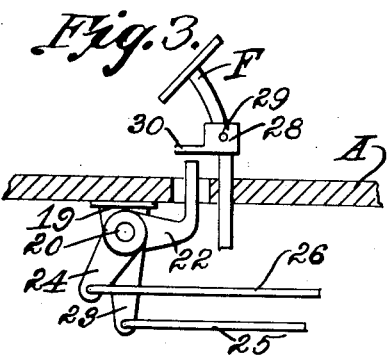
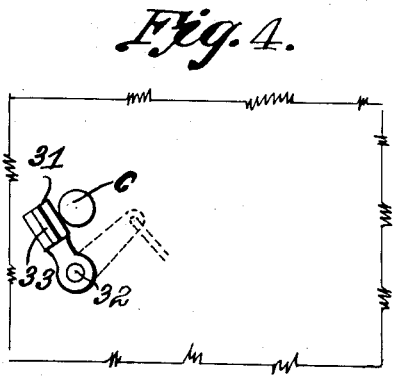
Ura U. Ulam
Oscar Frykman
INVENTOR
BY Victor J. Evans
ATTORNEY
WITNESS:
William Thompson Patented Feb. 16, 1932

1,845,855

UNITED STATES PATENT OFFICE

URA U. ULAM AND OSCAR FRYKMAN, OF AVONMORE, PENNSYLVANIA; URA U. ULAM ADMINISTRATOR OF SAID OSCAR FRYKMAN, DECEASED

MOTOR VEHICLE STARTING ATTACHMENT

Application filed October 5, 1928. Serial No. 310,624.

This invention relates to motor vehicle attachments and its general object is to provide a controlling device for the distributor of the ignition system of a motor vehicle, that is primarily designed to retard the spark in the event it is advanced, prior to closing the switch to the starting motor of the vehicle, with a foot throttle forming a part of the device and arranged above the button of the starting switch so that the device will be operated to retard the spark before the starting switch is closed to operate the starter, with the result it is impossible to close the starting switch with the spark advanced, therefore damage and the like caused by starting the vehicle motor with the spark advanced will be eliminated.

Another object of the invention is to provide a distributor and carburetor controlling device that will retard the spark and set the throttle valve prior to closing the switch of the self starter, so that the motor of the vehicle will be in proper condition to be started.

A further object of the invention is to provide a device of the character set forth, that is extremely simple in construction, inexpensive to manufacture and install and efficient in operation and service.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:

Figure 1 is a view of one form of our invention and showing the device connected to the carburetor and distributor of a motor vehicle.

Figures 2, 3 and 4 illustrate modified forms.

Referring to the drawings in detail, and particularly to Figure 1, the letter A indicates the floor board of a motor vehicle, B the starting motor switch and C the button for the switch.

Secured to the floor board and rising therefrom is a bracket 15 having a foot receiving pedal 16 pivotally secured thereto, through the instrumentality of a pivot pin 17. A leaf spring 18 has one end secured to the bracket while its opposite or free end is arranged in contacting engagement with the lower end of the foot pedal 16 for the purpose of holding the latter in the position as shown. Depending from the floor board and being secured thereto is a bracket 19 having a pin 20 pivotally secured therein. The floor board in this form of the invention is provided with an opening through which projects the rounded vertical portion 21 of an angle member that includes a flattened portion 22 fixed to the pin 20 which likewise has secured thereto a pair of arms 23 and 24, the arm 23 being in connection with the carburetor D through the medium of a rod 25, while the arm 24 is in connection with the distributor E through the medium of a rod 26. The vertical portion 21 of the angle member is arranged in the path of the foot pedal 16, and the starting button C is likewise arranged in the path of said pedal 16, but it will be noted that the pedal will engage the upper end of the vertical portion 21 before it reaches the starting button C, 24 that are in connection with the carburetor will be operated prior to the closing of the starting switch B.

In Figure 2 we employ the pedal 16 as well as the angle member and arms 23 and 24 that are in connection with the carburetor and distributor, but it will be noted that the pedal 16 is provided with an opening through which passes the shank of a starting switch lever F that has a foot receiving plate on its outer end, and the pedal 16 has disposed about its opening an abutting ring 27 which is provided with an inclined upper edge whereby when the lever F is depressed, the plate 16 will engage the ring about its entire upper edge to insure uniform pressure of the pedal for engagement with the angle member for the purposes as above set forth.

In Figure 3 we have illustrated a collar 28 for the starting switch lever and this collar is secured to the shank of the lever through the medium of a set screw 29 and has formed therewith and extending therefrom a lug 30 that is arranged for engagement with the angle member as shown.

Figure 4 illustrates a hand lever 31 for the device and this hand lever is secured to a pin 32 which is in connection with the distributor and arranged through the instrument board of a vehicle adjacent to the starting button C that in the present instance is shown as being carried by the instrument board. The hand lever 31 has formed therewith a fin 33 to provide a finger gripping piece for operating the lever as will be apparent. In this form, the lever will cover the starting button and must be moved so that access may be had to the button when starting the motor.

In the arrangement of the invention in all of the forms as shown, the operator of the vehicle must operate the device before the starting switch can be put into operation, with the result in the event the spark is advanced the latter will be retarded and thereby prevent damage and the like caused by starting the vehicle motor with the spark advanced, and in the forms of the invention as shown in Figures 1, 2 and 3, the distributor is not only put into operation before the starting switch is actuated but the carburetor is likewise set so as to insure easy and expeditious starting of the vehicle motor.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A motor vehicle attachment comprising a bracket depending from the floor board of a vehicle, a pin pivotally secured in said bracket, a pair of arms secured to said pin, a pair of rods, one of said rods having one of its ends associated with the distributor of a vehicle, and its opposite end pivotally secured to one arm while the other rod has one of its ends associated with the carburetor of the vehicle and its opposite end pivotally secured to the other arm, a bracket rising from the floor board of the vehicle, a foot pedal pivotally secured with respect to said bracket, means for holding said foot pedal in normal position, said foot pedal being adapted to actuate a switch for closing a circuit to the starting motor of said vehicle, an angle member having a flattened portion secured to said pin and a rounded vertical portion passing through an opening formed in the floor board and arranged in the path of the pedal to be moved thereby prior to the pedal actuating the switch.

In testimony whereof we affix our signatures.

URA U. ULAM.
OSCAR FRYKMAN.